United States Patent Office.

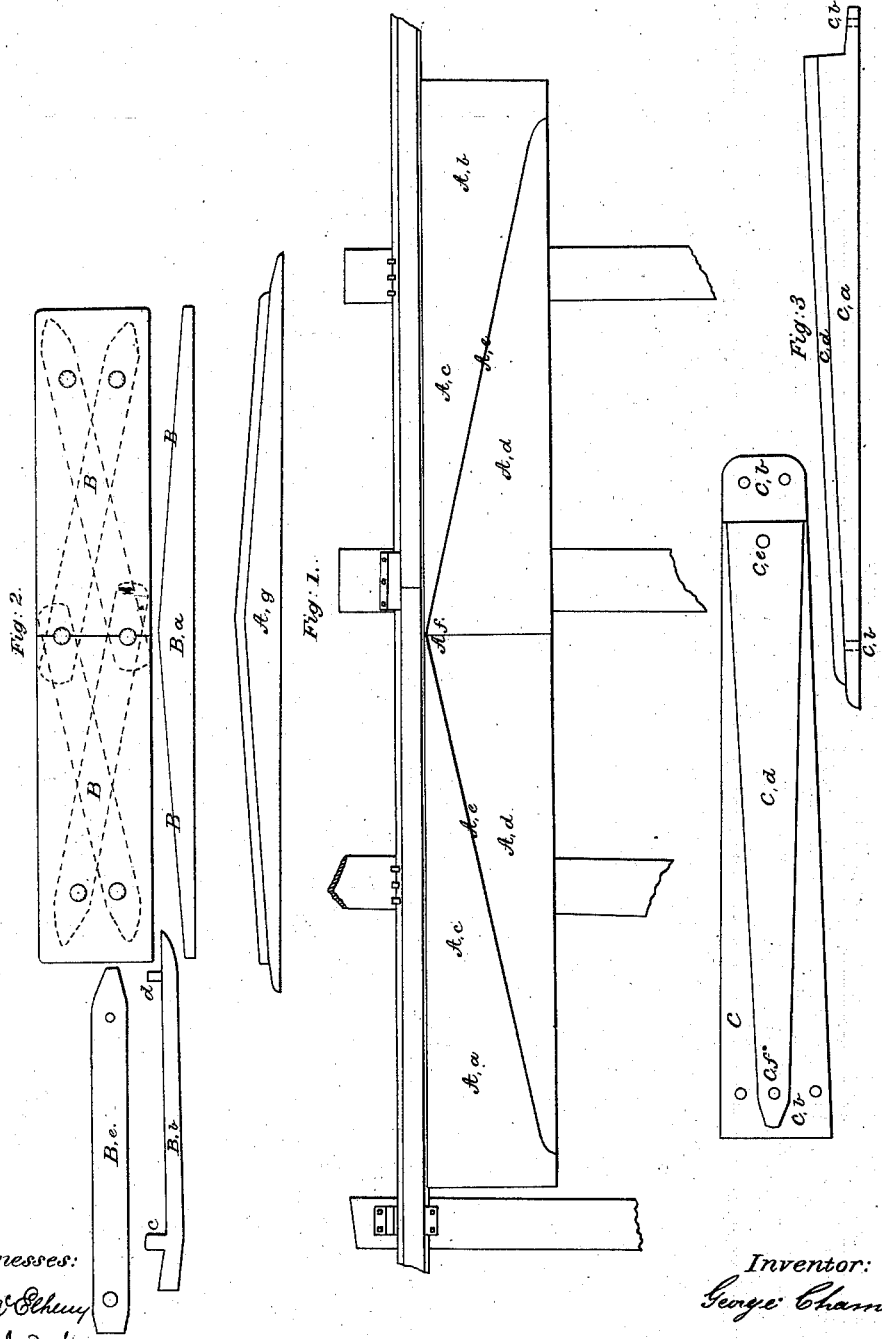

IMPROVED CAR REPLACER.

GEORGE CHAMBERS, OF ITHACA, NEW YORK.

*Letters Patent No. 60,137, dated December 4, 1866; antedated November 26, 2866.*

SPECIFICATION.

TO ALL WHOM IT MAY CONCERN:

Be it known that I, GEORGE CHAMBERS, of the town of Ithaca, in the county of Tompkins, and State of New York, have invented a Truss or Trunnion for Replacing Wheels of Railroad Cars off of the track; and I do hereby declare that the following is a full and exact description thereof, reference being had to the annexed drawings, and to the letters of reference marked thereon.

My object is to make a portable truss, tool, or article, in such a manner that it can be immediately adjusted to the track and the displaced wheel or wheels, and so fitted to each that by any convenient traction the wheel or wheels may be easily replaced on the track by its use. This I accomplish by an iron, or iron and wood inclined plane, so shaped as to be placed beside the rail, inclined towards the rail, or in other positions, either on the inside or outside of the rail, and thus be in an appropriate manner adjusted, so that the truss, trunnion, or tool shall fit the rail and raise the wheel to its appropriate place on the track. In order to make it more perfect, I make it inclined at each end, so that it shall suit either side of the rail, and either direction of the movement of the car. Of course I use at least two trusses or tools at the same time, in ordinary cases, one for the inside, and the other for the outside of the track, for unless the track is spread, broken, or otherwise injured, or the wheel axle is bent or broken, one wheel cannot go off of the track on one side unless another also goes off on the other side, thus rendering it usually necessary to use at least two of my trusses at the same time. When several wheels are off of each rail, and have run some distance from their rails, I use four or more trusses with advantage, at least one pair, or two trusses to each truck; and in this case I may at first place the trusses some distance from the rails, and when I have caused the wheels to go as near the rails as they can by one traction of the wheels over the trusses, I again place them before the wheels, and so on until at last the trusses place the wheels on the rails. And in a similar manner I adapt my trusses, one or more of them, to fit every emergency. And on my truss I construct two surfaces, one for the outside of the track, and the other for the inside of the track. I also use, when I choose, several minor adjustments. Thus I make a useful article, which I have termed a tool, truss, or trunnion, for use on a railroad.

In fig. 1, A *a* is the one end of the truss, and A *b* the other end; A *c*, A *c*, are the two surfaces for replacing the wheels which are off on the inside of the track; and A *d*, A *d*, are the two surfaces for replacing the displaced wheels, on the outside of the track. The perpendicular surfaces, or edges, A *e* and A *e*, in the former case, guide the wheel by the pressure against the outside of the flange of the wheel, the weight of the wheel resting on the surface A *c* of the truss, on the edge of its flange, and in the other case the edge A *e* guides the wheel by the inside of the flange, the weight resting on A *d* by the tread surface of the wheel. The height and sizes of the truss being suited to the rail, in the one case to bring the tread of the wheel on the rail, and in the other to carry the flange over the rail; and this is true, be the motion of the car in either direction. The truss is represented as on the inside of the rail, but the same is true when placed on the outside of the rail, or in any position in regard to the rail. My truss at once carries the wheel, in either case, upon the rail, or first causes it to approach the rail, and then to go on the rail or rails where the wheels belong. The summit, A *f*, is in either or any position placed towards the rail. At A *g* is a side elevation of my truss A.

In fig. 2, B and B are the two inclined surfaces, seen in side elevation at B *a*, for the same purposes as in A. At the ends of B are two holes, and two holes are at the summit of the planes. These holes are for the purpose of adjusting the movable piece or part, B *b*, to the truss, by pins that project from it, the pin *c* fitting the holes in the summit, and the pin *d* those in the ends. B *b* is a side view of this piece, and B *e* a view from above. The dotted lines indicate the adjustments of this piece, and show its uses to be similar to the truss A.

In fig. 3, C is a single plane seen in profile at C *a*; the holes C *b* being used to hold the truss in place by the rail. The piece or part, C *d*, is movable on its pin, C *e*, the pin C *f* fitting either of the holes at the foot of the incline. Its uses are clear from what has been said. In any or all forms of my truss I use clamps, made as simple bent irons and rods, irons with screws, or other common and well-known shapes, by which I retain them in place, and, if necessary, to hold them to the rail. Or I drive spikes into the ties, or bolts or crowbars in the ground, or otherwise hold my trusses from moving from the places where they are used, or keep them near to or in contact with the rails of the track, whenever I consider it necessary so to do.

In the use of my truss, the thin or lowest end is placed next to the displaced wheel, in front of it, when the flange of the wheel mounts the truss, and the wheel is guided by the truss on the track, in a manner apparent to those skilled in the art to which it appertains, by means of the surfaces or parts described.

*Claim.*

1. I claim the truss, trunnion, or tool, A, made with two surfaces, one for replacing a wheel from the inside, and the other from the outside of the track; and the duplicating the same in one instrument or trunnion, so as to fit any emergency and either direction of motion of the displaced wheel or wheels, as described.

2. I claim on either a single or double inclined plane, with a surface or surfaces suited to replacing a wheel off of the track, the placing or combining therewith an adjustable piece or part, which, while it aids in replacing a wheel off on the inside of the track, is also useful in carrying the flange over the rail when the wheel is off on the outside of the track, as described, and all equivalents thereunto.

GEORGE CHAMBERS.

Witnesses:
    SAMUEL J. PARKER,
    T. McELHENY.